(12) United States Patent
Zendri et al.

(10) Patent No.: US 11,920,731 B2
(45) Date of Patent: Mar. 5, 2024

(54) DISTRIBUTOR FOR A LUBRICANT OR FLUID AND A SYSTEM WITH A DISTRIBUTOR

(71) Applicant: Dana Italia S.r.l., Arco (IT)

(72) Inventors: Fabrizio Zendri, Rovereto (IT); Matteo Dallapiccola, Bedollo (IT); Manuel Albarello, Riva del Garda (IT)

(73) Assignee: Dana Italia S.R.L., Arco (IT)

(*) Notice: Subject to any disclaimer, the term of this patent is extended or adjusted under 35 U.S.C. 154(b) by 204 days.

(21) Appl. No.: 17/454,371

(22) Filed: Nov. 10, 2021

(65) Prior Publication Data
US 2022/0154879 A1 May 19, 2022

(30) Foreign Application Priority Data

Nov. 17, 2020 (DE) ...................... 20 2020 106 588.2

(51) Int. Cl.
*F16N 25/00* (2006.01)
*F16N 21/00* (2006.01)

(52) U.S. Cl.
CPC ............. *F16N 25/00* (2013.01); *F16N 21/00* (2013.01)

(58) Field of Classification Search
CPC .......... F16N 25/00; F16N 21/00; F16N 11/00; F16N 21/02; F16C 33/6603
USPC ...................................................... 184/105.3
See application file for complete search history.

(56) References Cited

U.S. PATENT DOCUMENTS

| | | | | |
|---|---|---|---|---|
| 4,293,056 A | * | 10/1981 | Setree | F16C 33/6622 184/105.3 |
| 4,453,618 A | * | 6/1984 | Economaki | F16N 21/06 184/88.1 |
| 5,328,011 A | * | 7/1994 | Brister | F16D 13/74 184/105.3 |
| 6,311,716 B1 | | 11/2001 | Jones | |
| 6,901,948 B2 | | 6/2005 | Nimberger | |
| 7,917,243 B2 | * | 3/2011 | Kozlak | B29C 64/106 700/98 |
| D869,531 S | * | 12/2019 | Ascher | D15/150 |
| 10,670,184 B2 | * | 6/2020 | Petit | F16C 33/6622 |
| 10,976,005 B2 | * | 4/2021 | Petit | F16N 21/02 |
| 2015/0099087 A1 | | 4/2015 | Reznar et al. | |
| 2017/0216742 A1 | | 8/2017 | Prine et al. | |
| 2017/0370412 A1 | * | 12/2017 | Petit | F16C 33/6603 |

* cited by examiner

*Primary Examiner* — Michael R Mansen
*Assistant Examiner* — Mark K Buse
(74) *Attorney, Agent, or Firm* — Marshall & Melhorn, LLC

(57) ABSTRACT

A lubricant or fluid distributor may have a housing made in one piece and comprising an inner wall and an outer wall. The inner wall encloses an inlet chamber fluidly connected with an outside of the housing through a fluid inlet. A main chamber may be formed in between the outer wall and the inner wall, the main chamber fluidly connected with the inlet chamber and fluidly connected with the outside of the housing through one or more fluid outlets. A lubricant fitting member may be encapsulated within the inlet chamber. A system with the lubricant or fluid distributor may have a part to be lubricated.

16 Claims, 3 Drawing Sheets

DISTRIBUTOR FOR A LUBRICANT OR FLUID AND A SYSTEM WITH A DISTRIBUTOR

FIELD

The present disclosure relates to a distributor for lubricants or fluids or gels and may be applied in any industrial equipment or more generally in any construction where a lubricant, fluid or gel has to be provided to machine parts. One example of an application is a lubricant distributor used to distribute grease or other lubricants on the inner diameter of a lip-seal.

BACKGROUND

The presently proposed subject matter aims at creating a distributor, in particular a lubricant distributor, e.g. for a ring lip-seal, that is easy to produce and requires a minimized effort for production also in small series.

In the prior art, U.S. Pat. No. 6,311,716 B1 discloses a liquid distribution system, e.g. a lubricant distributor, assembled from several housings and numerous parts.

U.S. Pat. No. 6,901,948 B2 describes a liquid distribution system assembled from several housing parts.

U.S. Pat. No. 7,917,243 B2 generally deals with methods for generating build sequence data for a computer-aided design model of a three-dimensional object.

US 2015/0099087 A1 presents a method for manufacturing a printed encapsulation.

From US 2017/0216742 A1, a 3D printable single-pieced filter housing is known for connection of one liquid inlet and one liquid outlet.

SUMMARY

Taking into consideration the cited prior art, the presently proposed subject matter aims at creating a distributor, in particular a lubricant distributor, that is easy to produce and requires a minimized effort for production in small series.

Thus, a distributor for lubricant or fluid is presently proposed, the distributor comprising:
- a distributor housing made in one piece and comprising an inner wall and an outer wall, wherein
- the inner wall encloses an inlet chamber fluidly connected with an outside of the housing through a fluid inlet, wherein
- a main chamber is formed in between the outer wall and the inner wall, the main chamber fluidly connected with the inlet chamber and fluidly connected with the outside of the housing through one or more fluid outlets; and
- a lubricant fitting member encapsulated within the inlet chamber.

The simplest realization of the distributor housing is a cylinder symmetric part, which has an outer, cylindrical wall which encloses the inner wall, the main chamber and at least part of the inlet chamber. The inner wall may also be hollow, cylindrically shaped, or shaped with a cylindrical symmetry, and may for example be positioned in the middle of the main chamber, which is enclosed by the outer wall. If both the inner and outer walls are cylindrical or cylinder symmetrical, they may be positioned coaxially to each other. The main chamber in this case is a cylindrical chamber or a chamber with cylindrical symmetry between the inner and outer wall. The inlet chamber may be a cylindrical chamber which is enclosed by the inner wall. The inlet chamber may at the same time be positioned in the middle and on the cylinder axis of the space enclosed by the outer wall. In this case, the inlet chamber and the main chamber are positioned coaxially to each other. These two chambers may overlap fully or for a certain length along the cylinder axis of the distributor housing. By this measure, the overall length of the distributor may be significantly reduced. A lubricant or fluid can be transported along the cylinder axis of the distributor into the inlet chamber and from there through one or a plurality of inner radial channels through the inner wall to the main chamber. The fluid/lubricant may be stored in the main chamber, which forms a reservoir for the fluid/lubricant. From the main chamber, the lubricant/fluid may flow through outer radial channels passing the outer wall to the cylindrical outer surface of the distributor and from there to the part which is to be lubricated. The distributor further comprises a fitting member encapsulated within the distributor housing and, more specifically, inside the inlet chamber. This fitting member may be a body separate from the distributor housing. In particular, the distributor housing comprising the inner and outer wall may be produced as one single integral part, and the fitting member may be produced separately from the distributor housing and added to the distributor housing after separate production, and potentially during the production of the distributor housing.

The fitting member may be made of a material that is different from the material of the distributor, for example a metal, or of the same material as the distributor housing. The fitting member is a hollow cylindrical part and typically has a thread on its inside or outside circumference at least at one of its ends. Further, the fitting has a central channel which acts as an inlet opening for the inlet chamber of the distributor.

The distributor housing and the fitting member may for example be produced by a moulding process, potentially a dead-mould cast process, or in a so-called 3D printing process or additive manufacturing process. These production processes are especially adapted to production of parts in moderate or small numbers. If the fitting member is made of a metal, it will, however, typically be produced in a machining process.

A potential implementation of the presently proposed distributor provides that the outer geometry of the housing is configured to be coupled to a part to be lubricated, preferably in a form-fit manner. The outer shape of the distributor is in this case adapted to the shape of the part to be lubricated. This is particularly easy in the case of ring seals to be lubricated, be it, for example, elastomer seal rings or metallic, flat disk-shaped seal rings.

A further potential implementation of the presently proposed distributor provides that the inlet chamber and the main chamber are fluidly connected through one or more connection channels, for example radial inner channels. This is a feature that enables the constant delivery of a fluid/lubricant from the inlet chamber to the main chamber wherein the lubricant can further flow from there through outer radial channels to the outside surface of the distributor or distributor housing.

The presently proposed distributor may also be implemented by providing that the main chamber, at least in some regions, expands in the radial direction. By this shape, the main chamber may have the right size for storing enough fluid/lubricant to deliver it reliably in constant rates to the outside of the distributor.

It may also be provided that a maximum height of the main chamber substantially corresponds to the height of the inlet chamber, measured in a direction parallel to a cylinder axis of the distributor.

The presently proposed distributor may also be implemented by providing that the fluid outlets are distributed along the outer wall in axial and circumferential direction of the distributor. The fluid outlets thereby may deliver a fluid/lubricant in an appropriate, homogeneous spatial distribution. The fluid outlets are the ends of the outer channels which extend through the outer wall. The cross section of these outer channels may be circular, but it may also have the shape of fluid drops, in particular in case the distributor housing is manufactured by an additive manufacturing process, as will be explained in further detail below.

It may be advantageous to implement the presently proposed distributor by evenly distributing the fluid outlets along the inner surface of the part to be lubricated.

Another advantage may be obtained by providing that the fitting member is part of a commercial fitting. In this case, the fitting member is easily available, cheap and has already the appropriate thread for a fluid tight connection with a delivery tube or hose.

When the fitting member is positioned in the inlet chamber of the distributor housing, this inlet chamber needs an opening through which the fitting member may be moved to the inside. This opening shall be closed after the positioning of the fitting member to fix the fitting member in the inlet chamber and to allow for a fluid-tight connection of the inlet chamber to a delivery tube or hose. Therefore, an additional material layer is provided to close the opening of the distributor housing, leaving the opening of the fitting member open for the passage of a delivery tube or hose. It may further be provided that a small, ring-shaped gasket is provided on the fitting member in order to improve the adherence of layers added to the distributor housing, for example, printed thereon in a 3D printing process.

The additional layer in the form of a ring-shaped gasket may be molded or glued or simply laid on the fitting member and the distributor housing as a first cover and it may be fixed by an additional material layer that is added after the positioning of the fitting member and the first cover, by a 3D printing process. The first cover may for example serve to provide a better adherence of the additional material layer which in some cases will not easily adhere to the surface of the fitting member.

Another potential implementation provides that the fitting member is made of metal. Metal is the usual material for commercial fitting members. The fitting member may, however, also be made of a plastic or cast resin/polymer material.

A further implementation may provide that the distributor is at least partially produced in an additive manufacturing process, for instance by fused filament deposition, stereolithography, direct laser sintering, and/or multi jet fusion.

It may also, as already partially explained above, be provided that in addition to the housing and the separate fitting, which is encapsulated in the inlet chamber, a separate first cover in the form of a gasket is provided, which has the shape of a ring-shaped disk and is located on the front side of the fitting member, wherein the ring-shaped disk has an opening which is aligned with an inlet or thread opening of the fitting member.

It may also in some cases be advantageous to provide, in addition to the housing and the separate fitting, which is encapsulated in the inlet chamber, a separate second cover in the form of a gasket that has the form of a ring-shaped disk, is located on an outer shoulder of the housing close to its front end and forms a flange which protrudes from the outer wall of the housing in radial direction.

The front end of the distributor housing in this case is the end on which the inlet opening is provided. The second cover may as well as the first cover be added to the distributor housing after an initial production step of the distributor housing and during a pause of the production process. This pause can also be used to position the fitting member in the inlet chamber. After this step, the first and second covers can be added, and both may be fixed to the distribution housing by adding an additional layer by an additive manufacturing process, in particular, an FFD process. This additional layer should adhere well to the distributor housing as well as to the first and second cover.

The separate addition of the first and second cover facilitates the production of the distributor housing by a 3D printing/additive manufacturing process. If the production layers of the distributor housing are parallel to the surface of the first and second cover, i.e. the stacking direction is perpendicular to the flat surface of the first and second covers, these covers would need a separate support when the respective material would be deposited in a 3D printing process. This is the reason why shapes of bodies that are to be produced in a 3D printing process have to be appropriately adapted. The angle between a surface to be shaped and the direction of stacking the layers is in many cases limited, e.g. to an angle smaller than or equal to 45 degrees. By adding an additional part like a disk or ring disk as a pre-produced part at the right point in time during the 3D printing process, this problem is avoided. Further, some 3D printing methods, such as the FFD process, have the advantage that they can be interrupted for a pause, for example in order to add an additional part, and can then be continued, with the consequence that the adherence of the layers added after the pause to the layers added before the pause can be guaranteed.

This way, it may be provided that one or both of the first and second separate covers is fixed to the housing by a layer of the material of the housing which is put on the front end of the housing and sticks to the material of the housing as well as to the first and second separate covers.

The presently proposed subject matter, in addition to a distributor as explained above, may further relate to a system comprising a respective lubricant distributor or fluid distributor and a part to be lubricated.

The presently proposed system further relates to a system wherein the part to be lubricated is in a radial form-fit engagement with the housing of a distributor of a shape explained above.

The presently proposed subject matter may further be implemented by a system with a lubricant distributor as explained above, wherein the part to be lubricated is in full circumferential form-fit engagement with the housing.

The presently proposed subject matter may further be related to a system wherein the part to be lubricated has the outer shape of a circular ring or a square ring.

A further implementation of the presently proposed system may provide that the fluid to be distributed is an industrial grease, an oil, a gel, a food liquid, a paste, a sauce, and/or a chemical or medical gel.

The presently proposed subject matter may further relate to a method of producing a distributor for a liquid, a gel or a lubricant, comprising a first step in which a first part of a distributor housing with an inner and an outer wall is produced by a 3D printing or additive manufacturing method, for example, a Fused Filament Deposition (FFD) method, wherein the inner wall encloses an inlet chamber, a second step in which a fitting member is introduced into the inlet chamber of the distributor housing, a third step in which at least a first cover, in particular a first and a second cover, is added as separate bodies, and a fourth step in which an additional layer is added to the distributor housing by additive manufacturing, said additional layer connecting at least one of the first and second cover to the distributor housing.

The presently proposed subject matter may further relate to a method of producing a distributor for a liquid, a gel or a lubricant, comprising a first step in which a first part of a distributor housing is produced by a 3D printing or additive manufacturing method, for example, a Fused Filament Deposition (FFD) method, wherein the first part of the distributor housing provides an inlet chamber, wherein in a second step, the additive manufacturing process is paused and a fitting member is positioned in the inlet chamber, wherein in a third step, a first cover is positioned on the fitting member, and wherein in a fourth step, an additional layer is added to the distributor housing by additive manufacturing, said additional layer connecting at least the first cover to the distributor housing.

DESCRIPTION OF THE FIGURES

Some examples of implementations of the presently proposed subject matter are illustrated by the following drawings, which will be described below.

Therein.

DETAILED DESCRIPTION

Figure 1:
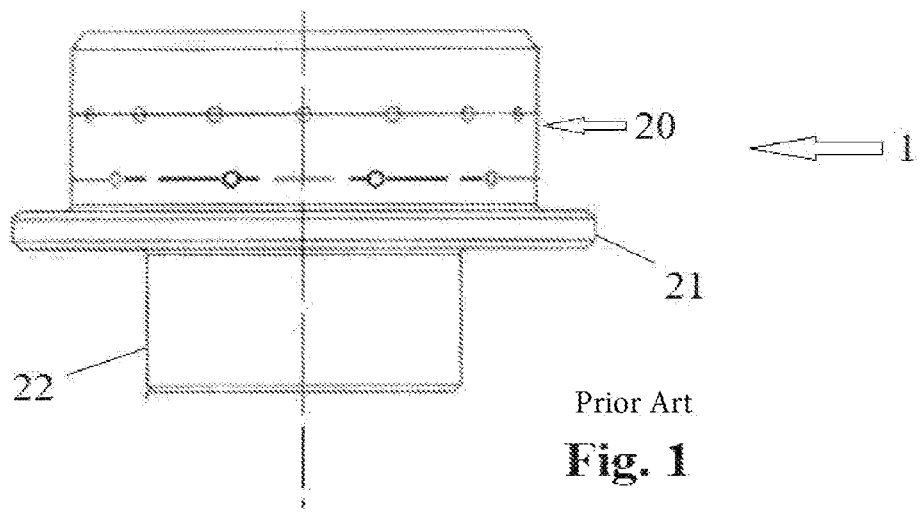
FIG. 1 shows an external view of a distributor according to the prior art.

FIG. 1 shows a lubricant distributor of the prior art made by machining which has a cylindrical part 20 with openings for lubricant delivered from the inside of the distributor. The openings are equally distributed over the circumference of the cylindrical part 20. Further, a flange 21 is provided on which the part that is to be lubricated reposes. In the lower part of FIG. 1 a cylindrical inlet part 22 is shown, which has an inlet opening that can be coupled with a lubricant delivery tube or hose.

Figure 2:
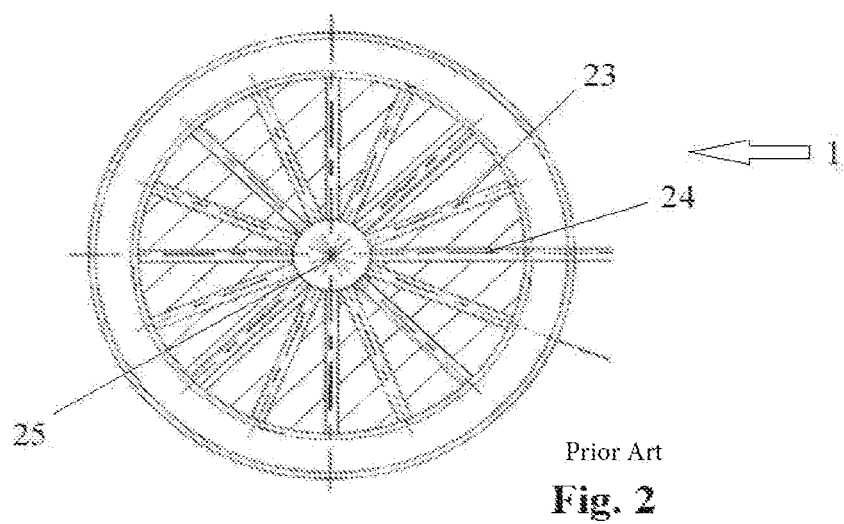
FIG. 2 shows a cross-sectional view of a distributor according to the prior art.

FIG. 2 shows a cross-section of the part shown in FIG. 1 wherein radial channels 23, 24 are shown, which lead lubricant from a central chamber 25 to the outside of the cylindrical part 20. The channels 23, 24 can easily be drilled into the body, which makes producing the distributor according to the prior art easy but wasteful of material because the cylindrical part 20, apart from channels 23, 24, is a solid mass. This makes the distributor heavy and expensive to produce.

Figure 3:
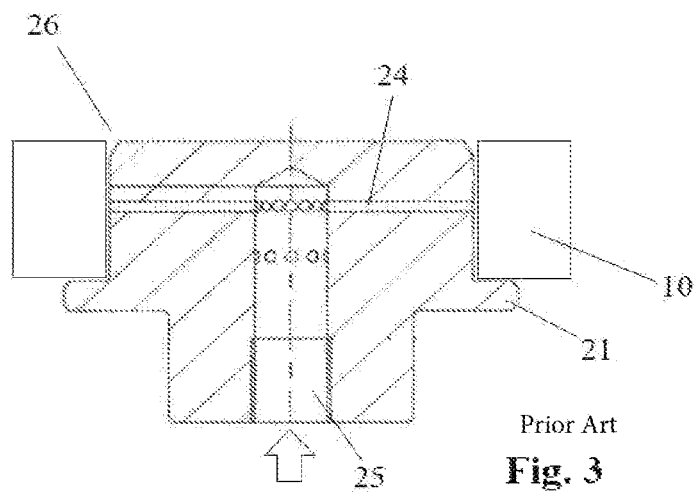
FIG. 3 shows a distributor according to the prior art in a longitudinal cross-section.

In FIG. 3, a cross-sectional view of the distributor according to the prior art is shown, which discloses a central chamber 25 and one of the channels 24. In addition, the flange 21 is shown as well as the part 10 that is to be lubricated. A chamfer 26 integrated into the distributor facilitates the positioning of the part 10 on the distributor.

Figure 4:
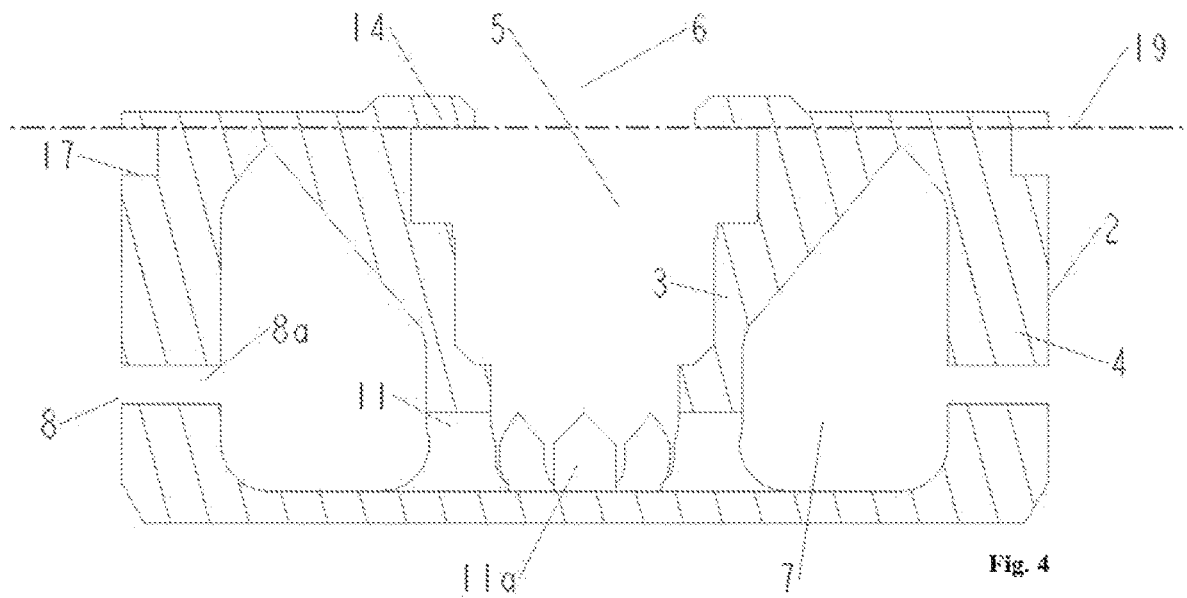
FIG. 4 shows a distributor housing of the presently proposed type without a fitting member and covers.

FIG. 4 shows a distributor housing of a lubricant distributor of the presently proposed type in a cross-sectional view. The housing 2 comprises an inner wall 3 and an outer wall 4, wherein the inner wall 3 encloses an inlet chamber 5. The outer wall 4 encloses a main chamber 7 as well as the inner wall 3 and the inlet chamber 5. Both the inner and outer wall 3, 4 have a cylindrical symmetry and are disposed coaxially with respect to each other. The inlet chamber 5 has an inlet chamber opening 6 at the front end of the housing 2. At the end of the housing 2 opposite to the front end, the inlet chamber 5 is connected to the main chamber 7 by radial inner channels 11, 11a, which deliver lubricant from the inlet chamber 5 to the main chamber 7. From the main chamber 7, a lubricant or a fluid may flow through outer radial channels 8a to the outlet openings 8, which are circumferentially distributed on the outside of the outer wall 4.

The housing 2 basically comprises two parts, wherein the first part lies below the dotted line 19 in FIG. 4. In a first step of 3D printing or additive manufacturing, the first part of the housing 2 up to the dotted line 19 is produced, and then the production process is paused. In a later step, an additional layer above the dotted line 19 is added and perfectly connects to the first part of the housing 2. When the first part of the housing 2 below the dotted line 19 has been finalized, a fitting member 9 is introduced into the inlet chamber 5. The fitting member 9 has an internal inlet opening 16 so that lubricant can pass through the fitting member 9 into the inlet chamber and further into the main chamber of the distributor. The fitting member also has on its inner cylindrical surface a thread that enables a connection to a delivery tube or hose.

After positioning the fitting member 9 in the inlet chamber, a first cover 12 in the form of a gasket may be placed on the front end of the fitting member 9. The first cover 12 has an opening 15 that is aligned with the inlet opening 16 of the fitting member 9. The first cover serves to prepare the housing for adding additional layers by a 3D printing process, since additional layers in some cases do not stick well to the surface of fitting members made, for example, from metal. During the same pause of the production process of the distributor housing, the second cover 13 may be placed on a shoulder 17 of the first part of the housing 2. The second cover has the shape of a ring-shaped flat disk and serves as a flange on which the part that is to be lubricated can repose. After positioning the first and the second cover 12, 13, the additional part of the housing, which is shown above the dotted line 19 in FIG. 4, may be formed by deposition of additional layers on the housing or on the first part of the housing, respectively.

Figure 5:
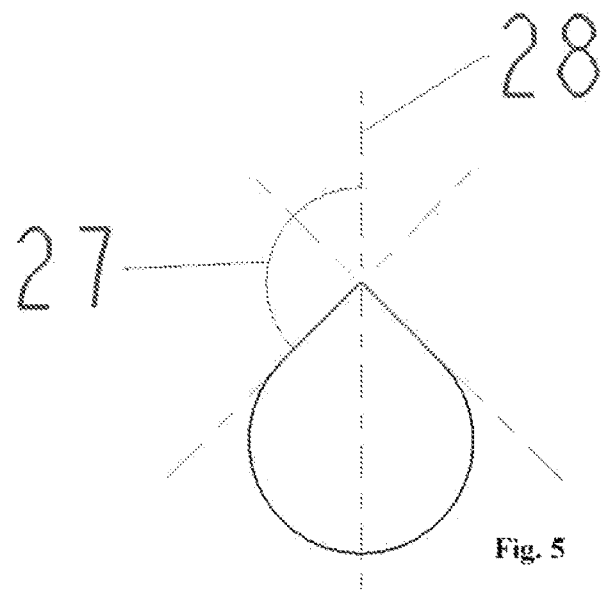
FIG. 5 shows a cross-sectional view of a radial outer channel produced in an additive manufacturing process.

FIG. 5 shows a drop-like cross-sectional shape of a channel with the upper part of the cross-section consisting of two arms meeting at an angle in the shape of a roof, wherein the angle 27 between vertical line 28 and each of the ceiling arms of the space is 135 degrees or more than 135 degrees. In this way, channels can easily be provided in a distributor housing made from a typical material used for 3D printing, such as a plastic material.

Figure 6:
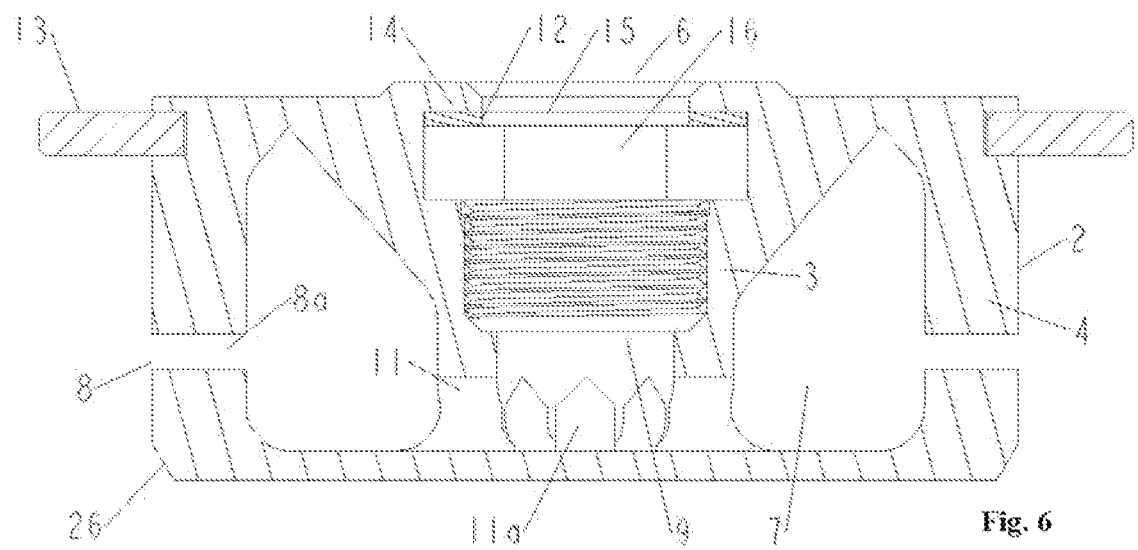
FIG. 6 shows a distributor housing of the presently proposed type with a fitting member and covers.

In FIG. 6, an exemplary cross-section of outer and inner radial channels 11, 11a, 8a of the housing 2 is shown. In a 3D printing process, and particularly in a FFD process, it is in particular difficult to form hollow spaces with a cover on top, since in the area above the hollow, material has to be deposited and would need some kind of support during the deposition process. This problem can be avoided by adapting the spaces to be formed and giving them a shape that is easier to manufacture by a 3D printing process.

Figure 7:
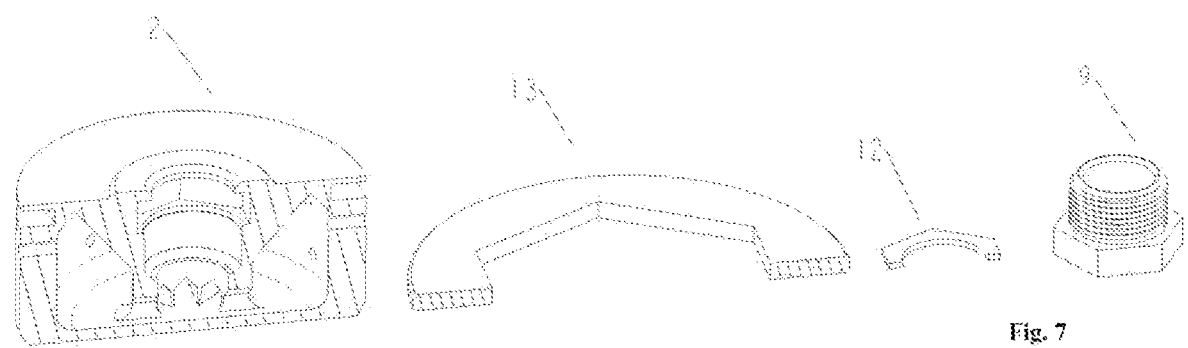
FIG. 7 shows a view of a distributor housing, two covers and a fitting member before assembly.

FIG. 7 shows, next to each other lying in a plane, a sectional part of the housing 2 of a distributor, which as such is obviously not functional but helps to show the internal structure, as well as one half of a first cover 12 and one half of a second cover 13, and a fitting member 9.

The above-described construction of a distributor for lubricant allows for an easy production in small series and the use of less material than would be necessary for producing a distributor housing by conventional machining methods.

What is claimed:

1. A lubricant or fluid distributor comprising:
   a housing made in one piece and comprising an inner wall and an outer wall,
   wherein the inner wall encloses an inlet chamber fluidly connected with an outside of the housing through a fluid inlet,
   wherein a main chamber is formed in between the outer wall and the inner wall, the main chamber fluidly connected with the inlet chamber and fluidly connected with the outside of the housing through one or more fluid outlets, the fluid outlets are distributed along the outer wall in axial and circumferential direction of the distributor; and
   a lubricant fitting member encapsulated within the inlet chamber.

2. A lubricant or fluid distributor according to claim 1, wherein the outer geometry of the housing is configured to be coupled to a part to be lubricated in a form-fit manner.

3. A lubricant or fluid distributor according to claim 2, wherein the fluid outlets are evenly distributed along an inner surface of the part to be lubricated.

4. A lubricant or fluid distributor according to claim 1, wherein the inlet chamber and the main chamber are fluidly connected through one or more connection channels.

5. A lubricant or fluid distributor according to claim 1, wherein a maximum height of the main chamber substantially corresponds to the height of the inlet chamber.

6. A lubricant or fluid distributor according to claim 1, wherein a small gasket or first cover is provided on the fitting member in order to improve the adherence of layers printed thereon.

7. A lubricant or fluid distributor according to claim 1, wherein the fitting member is made of metal.

8. A lubricant or fluid distributor according to claim 1, wherein the distributor is at least partially produced in an additive manufacturing process selected from the group fused filament deposition, stereolithography, direct laser sintering, and/or multi jet fusion.

9. A lubricant or fluid distributor according to claim 1, wherein in addition to the housing and the separate fitting member, which is encapsulated in the inlet chamber, a separate first cover or gasket is provided, which has the form of a ring-shaped disk and is located on the front side of the fitting member, wherein the ring-shaped disk has an opening that is aligned with an inlet opening of the fitting member.

10. A lubricant or fluid distributor according to claim 9, wherein the separate first cover or gasket is fixed to the housing by a layer of the material of the housing which is put on the front end of the housing and sticks to the material of the housing as well as to the separate first cover or gasket.

11. A lubricant or fluid distributor according to claim 1, wherein in addition to the housing and the separate fitting member, which is encapsulated in the inlet chamber, a separate second cover is provided, which has the form of a ring-shaped disk, is located on an outer shoulder of the housing close to its front end and forms a flange which protrudes from the outer wall of the housing in radial direction.

12. A system, comprising the lubricant or fluid distributor according to claim 1 and a part to be lubricated.

13. The system according to claim 12, wherein part to be lubricated is in radial form-fit engagement with the housing.

14. The system according to claim 12, wherein the part to be lubricated is in full circumferential form-fit engagement with the housing.

15. The system according to claim 12, wherein the part to be lubricated has the outer shape of a circular ring or a square ring.

16. The system according to claim 12, wherein the fluid to be distributed is an industrial grease, an oil, a gel, a food liquid, a paste, a sauce, and/or a chemical or medical gel.

* * * * *